No. 877,956. PATENTED FEB. 4, 1908.
M. R. SHOURDS.
WATER ELEVATOR.
APPLICATION FILED JUNE 6, 1907.
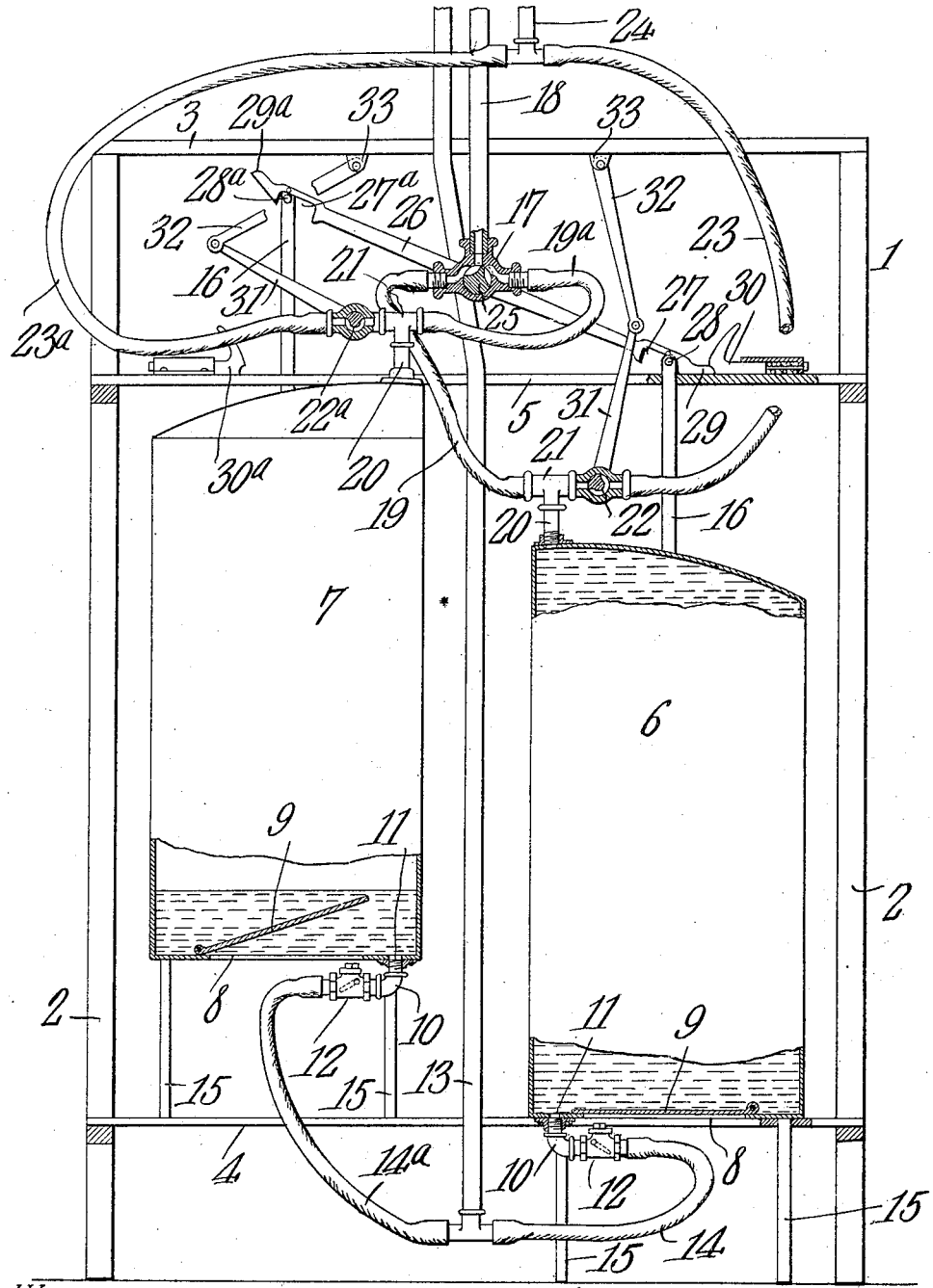
WITNESSES: Milo R. Shourds, INVENTOR.
By C. A. Snow & Co.
ATTORNEYS

UNITED STATES PATENT OFFICE.

MILO R. SHOURDS, OF NORTH POWDER, OREGON.

WATER-ELEVATOR.

No. 877,956.  Specification of Letters Patent.  Patented Feb. 4, 1908.

Application filed June 6, 1907. Serial No. 377,573.

*To all whom it may concern:*

Be it known that I, MILO R. SHOURDS, a citizen of the United States, residing at North Powder, in the county of Union and State of Oregon, have invented a new and useful Water-Elevator, of which the following is a specification.

This invention relates to an apparatus for raising or forcing water from a well, cistern, or other reservoir or source of supply by means of pneumatic pressure, the object being to provide a simple, self-acting water elevator requiring little attention and few operative parts of the most durable kind.

The accompanying drawing is an elevation of the improved water elevator, certain parts being shown in section to more clearly illustrate the invention.

The entire apparatus is carried in a frame 1, submerged wholly or in part below the surface of the water to be raised. The frame comprises uprights 2 connected by cross beams and such braces as are necessary to make it stable, among which may be noticed a top beam 3, a support 4 near the bottom of the uprights and a horizontal bar 5 between the beam 2 and the support 4 but near the top of the frame.

Within the frame are two independent upright receptacles 6 and 7 adapted to rise and fall alternately as they empty and fill with water. These receptacles may be of any size and shape demanded by the nature of their work and the conditions under which they are placed. Each receptacle 6, 7 is provided with a large opening 8 in its under side for the entrance of water thereinto and guarded by a gravity flap valve 9 to prevent the water in the receptacle escaping through the opening 8. An elbow 10 is connected to the bottom of each receptacle by a nipple 11 and to a check valve 12 in the same manner. A stand pipe 13, through which the water is forced, is connected to the respective check valves by flexible pipes 14 and 14ª. Attached to the bottom of each receptacle are guide rods 15 which slide through holes in the support 4, and a guide rod 16 on the top of each, passing through openings in the horizontal bar 5. By means of these guide rods the receptacles are prevented from moving in other than a vertical direction.

Suitably attached to the frame 1, above the horizontal bar 5, is a three way valve 17 to which are attached three pipes, viz: a compressed air pipe 18, a flexible air pipe 19 leading to the receptacle 6 and a second flexible air pipe 19ª leading to the receptacle 7. Extending upwardly from the top of each receptacle is a short pipe 20 carrying a T connection 21 attached respectively to the outlet ends of the flexible pipes 19 and 19ª. A valve 22 is attached to the opposite end of the T connection on the receptacle 6 and a similar valve 22ª to the connection on the receptacle 7. Flexible exhaust air pipes 23 and 23ª lead from the respective valves 22 and 22ª to a common exhaust pipe 24.

Fixed to the plug 25 of the three way valve 17 is a rocking lever 26, the arms of which extend in opposite directions and at equal distances from the valve plug 25. Near the outer ends of the lever 26 are notches 27 and 27ª each of which is adapted to engage with a stud 28 and 28ª respectively, one on each guide rod 16 so that as the receptacles rise the three way valve plug will be rocked and the direction of flow of the compressed air changed. The extreme outer ends of the lever 26 are formed into lips 29, 29ª to engage at the proper time with the respective spring latches 30 and 30ª. Secured to each valve 22 and 22ª is an arm 31, pivoted each to an arm 32 of equal length mounted to rock in fixed bearings 33 on the top beam 3 of the frame. The movement of the receptacles 6 and 7 raise and lower the valves 22 and 22ª which, through the toggle arms 31 and 32, open and close the passage through the valves from the respective receptacles to the flexible exhaust air pipes 23 and 23ª and common exhaust pipe 24.

The construction of the invention having been described, its operation is as follows: With the parts in the position shown in the drawing, which position represents the receptacle 6 filled with water in its lowermost position, and the empty receptacle 7 elevated; that end of the lever 26 bearing on the stud 28ª carried by the receptacle 7 is raised and the lip 29 on the opposite end of said lever in its downward movement strikes the curved finger of the latch 30 and pushes the latter back until the lip passes below said curved finger. The latch, under the force of its spring, moves forward to engage the lip and hold it and the receptacle in its lowered position. This movement of the receptacle 6 lowers the valve 22 and raises the valve 22ᵃ, causing the respective pairs of toggle levers 31 and 32 to close the former valve and open the latter one so that all air in the receptacle 7 can escape therethrough to the pipe 24, whereas the valve 22 being closed, the contents of the receptacle 6 will not be able to pass said valve.

The movement of the lever 26 rocked the three way valve into position to admit compressed air from the pipe 18 through the flexible pipe 19, T coupling 21 and the short pipe 20 into the receptacle 6, driving the water out through the flexible pipe 14 at the bottom into the stand pipe and from thence to its destination. The movement of the three way valve to open communication with the flexible pipe 19 shut off the air from the pipe 19ᵃ and receptacle 7. It will now be clear that as compressed air cannot pass from the pipe 19 through the valve 22 nor can it enter the receptacle 7 by way of flexible pipe 19ᵃ, it must perforce exert all its pressure on the water in the receptacle 6. At the same time, the outflowing water, passing freely through the check valve 12 on the receptacle 6, is prevented from entering the receptacle 7 by the closing of a similar check valve on the bottom of said receptacle and it is therefore compelled to enter the stand pipe.

The receptacle 7, because of the large inlet opening 8, fills rapidly with water, more rapidly than the receptacle 6 can be emptied, therefore, as soon as it is full of water it drops to its lowermost position, closing valve 22ᵃ and preventing water passing into the exhaust pipe. Water may flow continuously or intermittently from the receptacle 6, but as soon as it is empty or substantially so, its buoyancy causes it to rise, and, overcoming the tension of the spring latch 30, changes the position of the lever 26 and reverses that of the three way valve giving a clear passage for compressed air to enter the receptacle 7. The valve 22 is opened by the upward movement of the receptacle 6 and the air contained therein escapes through the exhaust pipe 23, water entering the receptacle at the same time from below.

It is to be understood that the accompanying drawing is only illustrative, and the proportions and arrangement of parts therein shown may be varied to a greater or lesser extent provided such changes do not depart from the spirit of the invention.

Having thus described the invention, what is claimed is:—

1. Combined in a water elevator, a pair of receptacles adapted to rise and fall alternately, a compressed air valve, a flexible pipe between each receptacle and said valve, means operated by the movement of said receptacle to change the direction of flow of compressed air from said valve, a valved opening in each receptacle for the admission of water, a flexible water outlet pipe leading from each receptacle, air outlet valves movable with said receptacle, and means for alternately opening and closing said outlet valves as the receptacles rise and fall.

2. Combined in a water elevator, a pair of alternating vertically movable receptacles, valved water inlet openings and outlet pipes at the bottom of each receptacle, a compressed air valve, pipe connections from said valve to each receptacle, means operated by the rise of said receptacles for operating the air inlet valve, an air outlet valve fixed to each receptacle, means for opening and closing said valves with the movement of the receptacles, and automatic means for locking said receptacles in their lower positions.

3. Combined in a water elevator, a pair of alternating vertically movable receptacles, water inlets at the bottom thereof, and valved water outlet pipes also leading from the bottom, a compressed air valve for admitting air to said receptacles, an air outlet valve fixed to and movable with each receptacle, a lever attached at its ends to said receptacles and centrally to said air valve for changing the direction of flow of the compressed air, and automatic means for alternately engaging the ends of said lever for holding the receptacles in operative position while being filled and emptied respectively.

4. Combined in a water elevator, a pair of receptacles, adapted to be alternately raised and lowered to be filled with and emptied of water, a three way valve attached to a compressed air pipe and to each receptacle, a rocking lever fixed at its center to the plug of said three-way valve, and its ends adapted to be lifted alternately by the lowermost receptacle when it rises and turn the valve plug to change the direction of flow of compressed air, a latch at each side of the elevator frame for alternately holding said receptacle fixed while being emptied, and a valved air outlet pipe attached to each receptacle.

5. Combined in a water elevator, a pair of receptacles adapted to be alternately raised and lowered, means for admitting water into and out of said receptacle, a compressed air valve mechanism for alternately admitting air to said receptacles, an air outlet valve fixed to each receptacle and connected to an exhaust pipe, an arm attached to each outlet valve, and a similar arm pivoted to each of said valve arms and to the frame of the apparatus.

6. Combined in a water elevator, a pair of receptacles adapted to move alternately in vertical direction and to be filled with and emptied of water, a valve attached to a compressed air pipe and flexibly piped to each of said receptacles, an air exhaust leading from each receptacle, a lever centrally attached to said air valve and adapted to engage a receptacle near each end, lips formed on the ends of said lever, and a latch adapted to engage alternately with each lip.

In testimony that I claim the foregoing as my own, I have hereto affixed my signature in the presence of two witnesses.

MILO R. SHOURDS.

Witnesses:
E. E. McLaren,
J. R. McLaren.